Aug. 8, 1967     G. D. BALDWIN     3,335,268
INSTANT CONTACT LAMP CONSTRUCTION
Filed Nov. 20, 1964     3 Sheets-Sheet 1
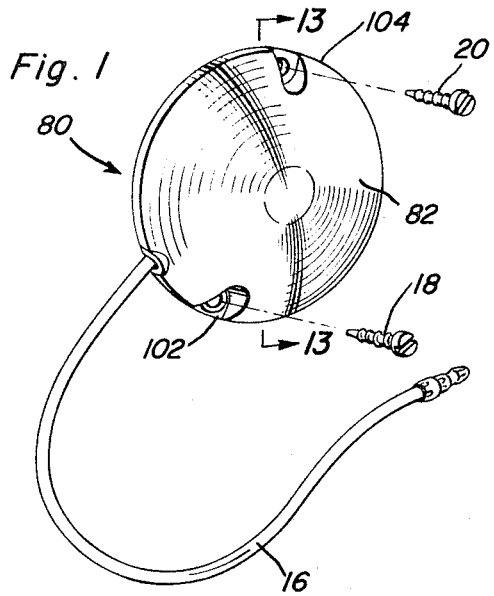
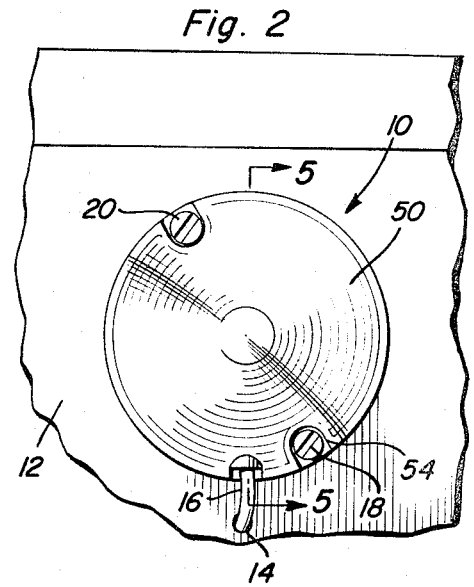
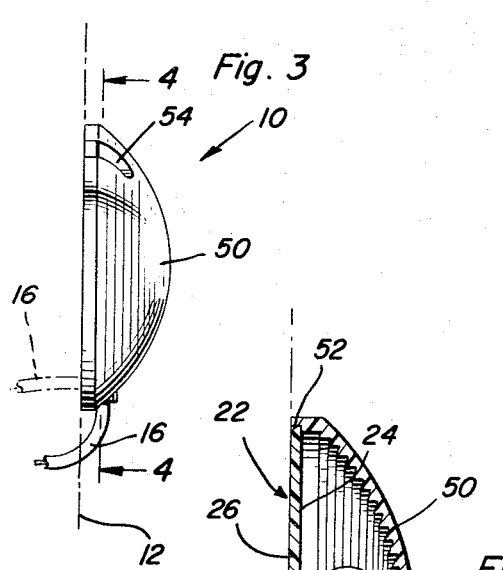
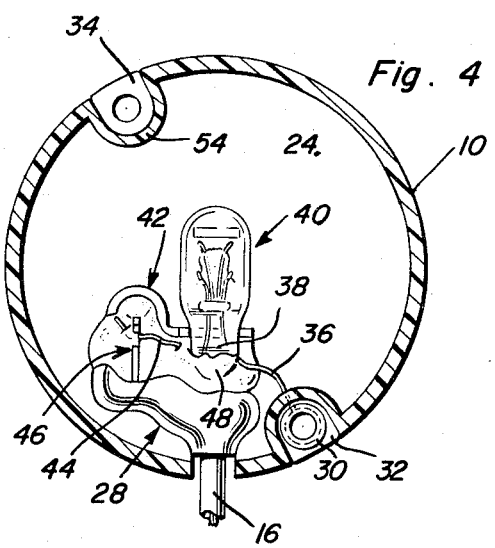
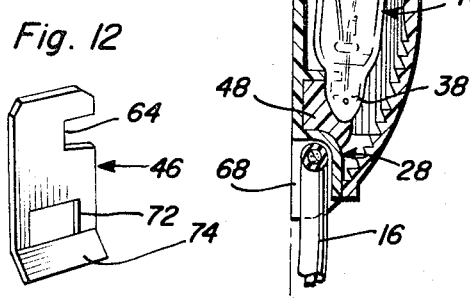
George D. Baldwin
INVENTOR.

Aug. 8, 1967    G. D. BALDWIN    3,335,268
INSTANT CONTACT LAMP CONSTRUCTION
Filed Nov. 20, 1964    3 Sheets-Sheet 2
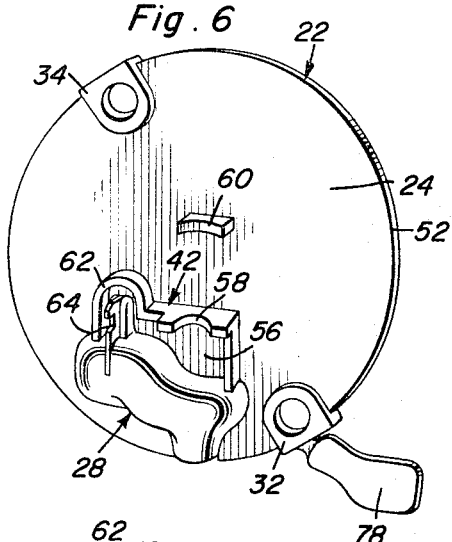
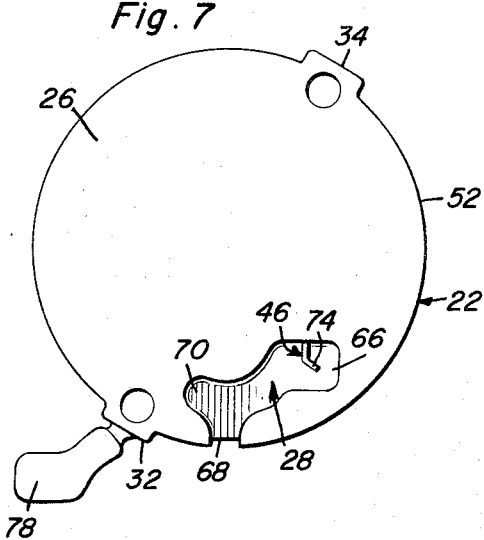
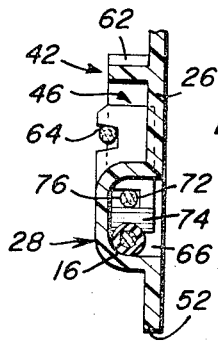
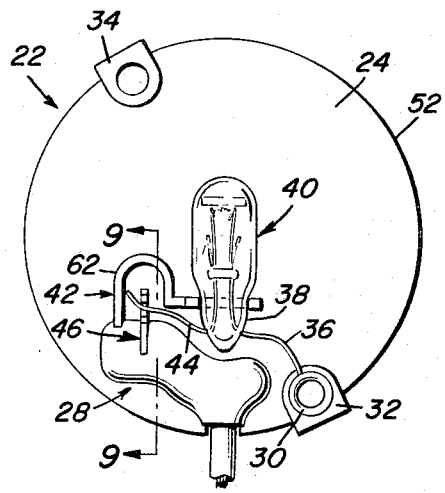
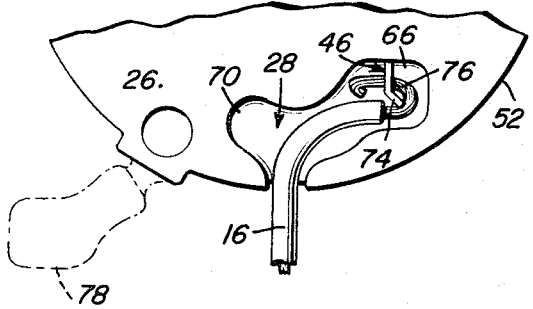
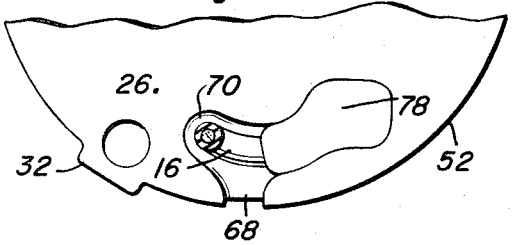
George D. Baldwin
*INVENTOR.*
BY Clarence A. O'Brien
and Harvey B. Jacobson
*Attorneys*

Aug. 8, 1967   G. D. BALDWIN   3,335,268
INSTANT CONTACT LAMP CONSTRUCTION
Filed Nov. 20, 1964   3 Sheets-Sheet 3
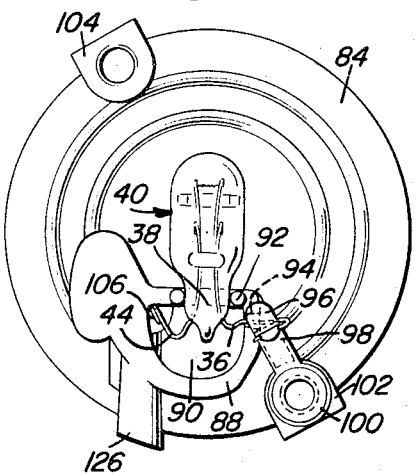
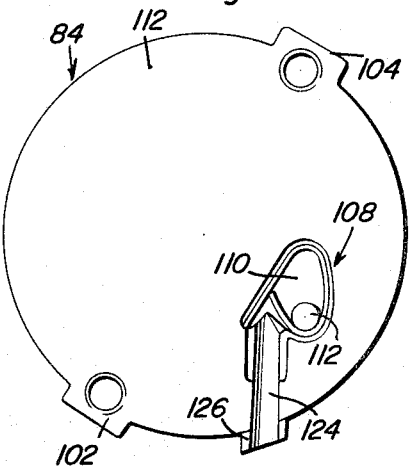
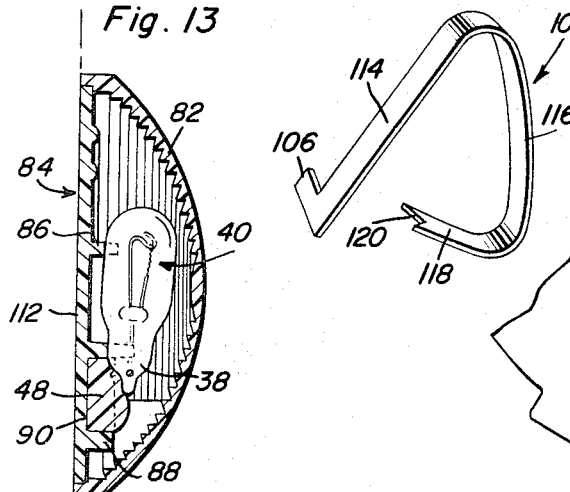
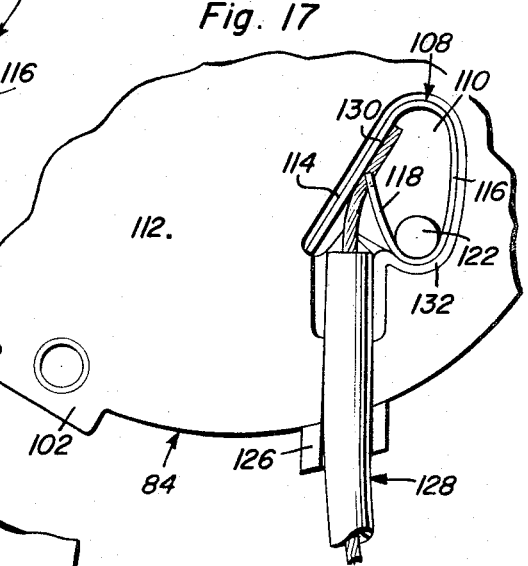
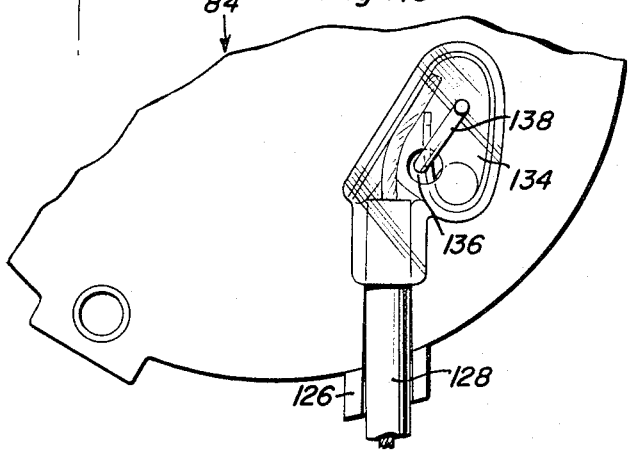
George D. Baldwin
INVENTOR.
BY Clarence A O'Brien
and Harvey B. Jacobson
Attorneys

United States Patent Office 3,335,268
Patented Aug. 8, 1967

3,335,268
INSTANT CONTACT LAMP CONSTRUCTION
George D. Baldwin, Jamestown, N.Y., assignor to Truck-Lite Co., Inc., a corporation of New York
Filed Nov. 20, 1964, Ser. No. 412,624
12 Claims. (Cl. 240—7.1)

This invention relates to a new and useful lamp construction particularly suited for mounting on a vehicle body although not necessarily restricted thereto.

The lamp construction of the present invention embodies several features and attributes of my prior Patent No. 3,089,951, in providing a vibration and weather resistant lamp capable of being fabricated with unexpected economy. In addition thereto, the arrangement of the lamp construction of the present invention significantly reduces the overall thickness of the lamp assembly so as to avoid any excessively projecting profile of the supporting surface to which the lamp is secured.

It is therefore a primary objective of the present invention to provide an economical lamp construction utilizing an unbased bulb secured by its filament leads to a thin, flat reflector and held in position by potting material, the filament leads being electrically connected to a ground terminal and a power terminal in such a manner as to permit the flat reflector to be secured to the supporting surface in direct contact therewith.

An additional object of the present invention is to provide a reflector for a lens sealed lamp through which electrical connections are made with an illuminating bulb mounted thereon without any spacing of the reflector from the supporting surface through which a power cable extends for electrical connection to the illuminating bulb.

A still further object of the present invention is to provide a reflector construction for a lens sealed lamp capable of being directly secured to the supporting surface and in contact therewith either directly over an opening in the supporting surface through which the power cable extends or spaced from said opening.

Another object of the present invention is to provide a lamp construction of the aforementioned types into which the bared lead portion of a power cable may be inserted to establish a firm mechanical and electrical connection in an effortless, rapid manner and without any tools.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing one form of a complete lamp assembly prior to installation on a supporting surface.

FIGURE 2 is a front elevational view of another form of lamp assembly installed on a supporting surface.

FIGURE 3 is a side elevational view of the installed lamp assembly shown in FIGURE 2.

FIGURE 4 is a sectional view taken substantially through a plane indicated by section line 4—4 of FIGURE 3.

FIGURE 5 is a sectional view taken substantially through a plane indicated by section line 5—5 in FIGURE 2.

FIGURE 6 is a perspective view of a disassembled portion of the lamp assembly showing the reflective side of the reflector.

FIGURE 7 is a rear elevational view of the parts shown in FIGURE 6.

FIGURE 8 is a front elevational view of the parts illustrated in FIGURE 6 with the illuminating bulb mounted thereon.

FIGURE 9 is a partial sectional view taken substantially through a plane indicated by section line 9—9 in FIGURE 8.

FIGURE 10 is an enlarged rear elevational view of a portion of the parts illustrated in FIGURE 7 with the power cable installed.

FIGURE 11 is an enlarged partial view similar to FIGURE 10 showing an alternative power cable installation.

FIGURE 12 is a perspective view of the wire locking terminal element associated with the lamp assembly illustrated in FIGURES 2 through 11.

FIGURE 13 is a sectional view of the form of the lamp assembly illustrated in FIGURE 1 taken substantially through a plane indicated by section line 13—13 in FIGURE 1.

FIGURE 14 is a front elevational view of one side of the disassembled reflector element associated with the lamp assembly illustrated in FIGURES 1 and 13, with certain parts assembled thereon.

FIGURE 15 is a front elevational view of the other side of the reflector element shown in FIGURE 14.

FIGURE 16 is a perspective view of the wire locking terminal element associated with the lamp assembly shown in FIGURES 1 and 13 through 15.

FIGURE 17 is an enlarged partial elevational view of the reflector element as shown in FIGURE 15 with a power cable installed therein.

FIGURE 18 is an enlarged partial elevational view similar to FIGURE 17 but showing a modification.

Referring now to the drawings in detail, it will be observed from FIGURES 2 and 3 that the lamp assembly generally referred to by reference numeral 10 is adapted to be mounted on a supporting surface 12 which may be the body of a vehicle for example. In one particular installation such as illustrated in FIGURES 2 and 3, the supporting surface 12 is provided with an opening 14 spaced from the lamp assembly through which a power connector cable 16 extends. The connector cable therefore establishes an electrical connection from a source of electrical energy to the lamp, the lamp being grounded by electrical connection to the supporting body 12 on which the lamp is mounted. Accordingly, a pair of conductive fastener screw elements 18 and 20 are provided which mount the lamp assembly on the supporting surface 12, the fastener element 18 also establishing a ground connection. As an alternative mounting arrangement, the lamp assembly may be mounted directly over the opening in the supporting body through which the connector cable 16 extends as shown by dotted line in FIGURE 3. Accordingly, the lamp construction is such as to permit extension of the connector cable therefrom either parallel to the supporting surface 12 or perpendicular thereto.

Referring now to FIGURES 4 and 5, it will be observed that the lamp assembly is composed of a thin reflector member 22 which is generally circular in shape having a forward reflective side 24 and a rear mounting side 26 forming a flat surface directly in contact with the supporting surface 12 on which the lamp assembly is mounted. The connector cable 16 is received within a channel formation 28 located on the reflector member adjacent to an annular ground terminal ring 30 which lines the aperture in the anchoring portion 32 of the reflector member located at an edge portion diametrically opposite the anchor portion 34. The fasteners 18 and 20 therefore extend through the apertures formed in the anchor portions 32 and 34 in order to secure the lamp assembly to the supporting surface and establish a ground connection for the ground terminal element 30. The ground terminal element 30 is therefore connected in any suitable manner to one of the filament leads 36 extending from the base portion 38 of an unbased bulb 40 mounted on the forward reflective side 24 of the reflector. Accordingly, a positioning pocket is formed on the forward side of the reflector between the channel formation 28 and a wall formation 42. The other filament lead 44 therefore extends from the base portion of the bulb and is secured to a power terminal element 46 to which the connector cable 16 is electrically connected. Potting material 48 which cures to an elastically resilient state, such as disclosed in my aforesaid prior Patent No. 3,089,951, is received in the pocket formed between the channel formation 28 and the wall formation 42 for contact with the base portion 38 of the bulb lead 36 and the connection between the filament lead 44 and the power terminal element 46 so as to prevent displacement of the bulb from its position on the reflector member and rupture or disconnection of the flexible filament leads under severe vibration or temperature changes. Thus, as in my prior patent aforementioned, the bulb is secured to the reflector by its filament leads and elastically held in position by the potting material by embedding part of the base portion of the bulb sufficient to prevent rupture of the leads because of excessive vibration of the bulb relative to the reflector.

The reflective side of the reflector member with the bulb mounted thereon is enclosed by a cover lens element 50 sealed by a plastic bonding material to the outer circular edge 52 of the reflector member. The cover lens element is also provided with diametrically opposite recess portions 54 through which the anchor portions 32 and 34 of the reflector member are exposed so as to receive the fastener elements 18 and 20.

As more clearly seen in FIGURES 6 and 8, the pocket 56 within which the potting material is received, is formed between the projecting channel formation 28 and the wall formation 42 provided with a guide recess 58 which seats the base portion 38 of the bulb. Accordingly, aligned with the recess 58, is a bulb positioning projection 60 for engagement with the bulb in spaced relation to the wall formation to properly space the bulb at an angle to the reflective side 24 of the reflector as more clearly seen in FIGURE 5. The wall formation 42 is also provided with a curved portion 62 extending the pocket 56 in surrounding relation to a notched end portion 64 of the power terminal element 46.

Referring now to FIGURES 7, 9 and 11, it will be observed that the channel formation 28 projects forwardly from the mounting surface of the rear mounting side 26 so as to form a channel therein which is of a depth exceeding the diameter of the connector cable 16. The channel includes an enlarged end portion 66 closely spaced from the edge 52 of the reflector member. A curved portion of the channel connects the enlarged end portion 66 to at least two entrance portions 68 and 70 closely spaced from the anchor portion 32 of the reflector member. The entrance portion 68 intersects the edge 52 of the reflector member so that a connector cable received within the channel formation may extend from the reflector member generally parallel to the mounting surface of the rear side 26 as more clearly seen in FIGURE 10. Alternatively, the connector cable may extend from the channel formation perpendicular to the mounting surface of the rear side 26 from the entrance portion 70 as more clearly seen in FIGURE 11. Also extending into the enlarged end portion 66 of the channel, is the apertured portion 72 of the power terminal element 46. With continued reference to FIGURES 7, 9 and 11, it will be observed that the wall of the channel formation enclosing the pocket 56, is provided with a slot within which the power terminal element 46 is mounted so that the opposite end portions thereof may respectively be disposed in the pocket 56 and in the enlarged channel portion 66. The terminal element is therefore made of a thin, flat conductive material and may be provided at the apertured portion 72, with a locking portion 74 which extends at an angle toward the end of the channel exposed through the rear mounting side 26 of the reflector member.

Referring now to FIGURES 9, 10 and 12, it will be observed that the connector cable 16 is provided with a bared lead portion 76, the conductor strands of which engage the locking portion 74 of the power terminal element and make a U-turn so as to be received through the apertured portion 72 of the power terminal element. The connector cable 16 is thereby locked against withdrawal from the channel. It will therefore be apparent, that the connector cable may be readily connected to the power terminal 46 by inserting the bared lead portion 76 thereof through the apertured portion 72 from one side, after which the cable is twisted about the locking portion 74 and seated in the channel, extending either from the entrance portion 68 or 70. After the connector cable is so installed, the bared lead portion 76 and portions of the terminal element projecting into the channel portion 66 may be enclosed in non-conductive relation to the supporting surface 12 on which the lamp assembly is subsequently mounted by means of an insert 78 as more clearly seen in FIGURE 11. The insert is a flat piece having a configuration corresponding to the channel shape but leaving the entrance portions 68 and 70 exposed. The insert when installed in enclosing relation to the bared lead portion of the cable will be flush with the mounting surface of the side 26. It will therefore be apparent, that the insert 78 may be formed of a thin piece of plastic secured by a frangible connection to the anchor portion 32 for example of the reflector member so that it will be readily available for use after the connector cable is installed.

FIGURES 1 and 13 illustrate another form of lamp assembly generally referred to by reference 80 which is similar in outward appearance to the lamp assembly 10 hereinbefore described and hence is secured to a supporting surface by means of the fastener elements 18 and 20. The lamp assembly 80 includes many constructional features similar to those described in connection with lamp assembly 10 including the lens cover element 82 sealed to a ribbed reflector disc element 84. The reflector element 84 also includes a bulb positioning projection 86 on which the unbased bulb 40 rests, with the base portion 38 thereof being held in position by any type of potting material 48 including the type described in connection with the lamp assembly 10. The reflector element 84 therefore is provided with a wall formation 88 forming a pocket 90 within which the potting material 48 is received as more clearly shown in FIGURE 14. A pair of spaced projections 92 extend from the wall formation 88 so as to receive therebetween the base portion 38 of the bulb in order to position the base portion within the pocket 90.

One of the leads 36 extending from the base portion 38 of the bulb extends through a seating groove 94 formed in the wall formation 88 and is secured in any suitable fashion to an upstanding end portion 96 of an elongated tongue 98 which extends from a grounding terminal ring 100 seated in the aperture formed in the anchoring portion 102 of the reflector element 84. A more reliable grounding connection is thereby established to the lead 36 of the bulb, this grounding connection being less likely to be ruptured during installation of the lamp assembly as compared to the arrangement described with respect to the lamp assembly 10. The anchoring portion 102 therefore extends from the reflector element 84 diametrically opposite the anchoring portion 104 so that the fastener elements 18 and 20 may secure the lamp assembly to the supporting surface while at the same time establishing a ground connection thereto. The other lead 44 from the bulb 40 is electrically connected to the power supply and is accordingly secured to a projecting portion 106 of a wire locking terminal element 108 illustrated in FIGURE 16.

The wire locking element 108 is seated within a cavity 110 formed in the reflector element 84 and opening on the outside of the lamp assembly or on the surface 112 which is to abut the surface on which the lamp assembly is mounted. The cavity is formed on one side of the pocket 90 opposite the anchoring portion 102 and overlaps the pocket 90 so that it may communicate therewith through a small opening into which the projecting portion 106 of the terminal element 108 extends. The element 108 therefore lines the walls of the cavity 110 and includes a flat portion 114 connected to the projecting portion 106. A curved portion 116 is connected to the flat portion 114 and diverges therefrom so as to line the opposite wall of the cavity as shown in FIGURE 15. A locking end portion 118 is connected to the curved portion 116 and is resiliently held in engagement with the flat portion 114 when the element 108 is installed within the cavity 110. The end 120 of the locking portion 118 is contoured for engagement of an electrical cable and the curved portion 116 is held in proper position within the cavity 110 by a positioning pin 122. The contour of end 120 may be varied in accordance with different requirements calling for the V-shape as illustrated or barbs as well as to grip two or more wires where the lamp is to be used as a juncture box.

Communicating with the cavity 110 between the projecting portion 106 and the locking portion 118 of the element 108, is an insert passage 124. An inlet portion 126 projects from the circular perimeter of the reflector disc 84 through which the insert passage 124 extends beyond the reflector disc by a small amount in order to accommodate reception of a power cable 128 as shown in FIGURE 17. It will therefore be apparent that the bared end 130 of the cable is inserted through the insert passage 124 into the cavity 110 causing the locking portion 118 of the element 108 to flex in the direction of insert in order to permit passage of the bared lead 130 completely into the cavity. The lead 130 will then be engaged by the contoured locking end 120 so as to clamp it against the flat portion 114 of the element 108 preventing withdrawal of the power cable 128 once inserted. The insert passage 124 may therefore be made with a slight taper converging toward the cavity 110 so that the sheathing of the power cable 128 may become wedged in place. It will also be appreciated that cables of different sizes having an outer diameter equal to or smaller than the smallest diameter of the insert passage, may be received and clamped in place by the element 108. Thus, a firm mechanical connection is established in a rapid and effortless manner and without the use of any tools.

A peripheral recess 132 is formed about the cavity 110, this recess extending along a portion of the insert passage 124. A covering insert may therefore be received within the peripheral recess 132 so as to cover the cavity 110 and a portion of the insert passage 124. This covering insert may be cast with the reflector element similar to the insert 78 described in connection with the lamp assembly 10 but may be permanently installed within the peripheral recess 132 so as to protectively cover the cavity. With such an arrangement, insertion of the power cable will establish a relatively permanent mechanical and electrical connection. If release of the connection so established is desired without damage to the element 108, a transparent type of covering insert 134 may be utilized as shown in FIGURE 18. In such case, an aperture 136 may be formed in the covering insert 134 aligned with the yieldable locking portion 118 so that a pin 138 may be inserted through the aperture in order to displace the locking portion 118 out of engagement with the lead 130 permitting withdrawal of the power cable.

From the foregoing description, the construction, operation and utility of the lamp assemblies of the present invention will be apparent. It will, therefore, be appreciated, that the lamp assemblies feature an unbased bulb mounted on one side of a flat reflector disc and held in position by potting material which also firmly holds the bulb leads respectively secured to a grounding element mounted by the reflector and a wire locking power terminal element. A power cable may accordingly be inserted into a cavity formed on the outside of the reflector disc element enabling the lamp assembly to be mounted on a supporting surface without any spacing from the outside of the reflector element. Further, installation of the power cable may be accomplished without the use of any tools and a reliable power connection established from both an electrical and mechanical standpoint. Thus, the rapid installational attribute and reliable locking feature of the lamp assemblies will be of considerable advantage in connection with the vehicle mounting environment to which the present invention pertains.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an instant contact lamp construction, reflective means having a mounting surface, illumination means mounted on said reflective means, a conductor having an electrical connection to said illumination means, and channel means formed in said mounting surface for receiving said conductor in a plane substantially parallel to the mounting surface, said channel means including at least two entrance portions forming conductor passages extending from the reflective means respectively parallel to the mounting surface and perpendicular thereto.

2. The combination of claim 1 including insert means received in the channel means flush with the mounting surface for enclosing the conductor in the channel means leaving the entrance portions exposed.

3. The combination of claim 1, including a terminal element mounted by the reflective means and extending into the channels means, said terminal element being connected to said illumination means and the conductor for establishing said electrical connection, and locking means mounted by the terminal element within the channel means for preventing withdrawal of the conductor therefrom.

4. The combination of claim 3 wherein said terminal element comprises, a flat elongated member notched adjacent one end for connection to the illumination means and being provided with an aperture at the other end for receiving the conductor, said locking means extending at an angle to the elongated member from said other end thereof for engagement with the conductor.

5. The combination of claim 4 including insert means received in the channel means flush with the mounting surface for enclosing the conductor in the channel means leaving the entrance portions exposed.

6. In an instant contact lamp construction, a reflector member having a flat mounting surface, fastener means for mounting said reflector member along outer peripheral edge portions of said mounting surface, a cable receiving channel formed in said mounting surface having at least two entrance branches, one of said entrance branches extending generally parallel to the mounting surface and intersecting the edge portion thereof, a terminal element extending into said channel in spaced relation to said entrance branches and locking means formed on the terminal element for engagement with a cable received in the channel through one of said entrance branches.

7. In combination with a lens cover, a reflector adapted to be sealed on one side by said lens cover, said reflector comprising a flat member having a reflective surface on said one side and a mounting surface on the other side, a wall formation projecting from said reflective surface to enclose a pocket on said one side and form a cavity opening on said other side, said cavity having a portion overlapping the pocket, a bulb having leads extending therefrom through said pocket, means for positioning said bulb on said one side of the flat member, conductive locking means seated within said cavity and having a connecting portion within the overlapping portion of the cavity extending into the pocket for connection to one of the leads of the bulb, insert passage means formed in the other side of the flat member communicating with the cavity for receiving the lead of a power cable in locking relation to the conductive locking means, and an insert cover enclosing the cavity flush with said mounting surface on the other side of the flat member.

8. The combination of claim 7 wherein said locking means includes a resilient metallic strip having a wall portion lining the cavity and a locking portion deflectible in one direction away from said wall portion, insert passage means communicating with the cavity between the wall and locking portions to permit insertion of the lead deflecting said locking portion.

9. The combination of claim 8 including an anchoring portion connected to the flat member, a conductive ground element seated in said anchoring portion outside of the lens cover, said ground element having a tongue extending into the lens cover and electrically connected to the other lead from the bulb.

10. In a lamp construction, a reflector having a forward side and a rear side, a guide pocket formed on the forward side of the reflector, an unbased bulb having a filament enclosed therein and a pair of filament leads extending from a base portion of the bulb, said base portion being seated in the pocket for positioning the filament and the bulb in spaced relation to the forward side of the reflector, a power terminal element mounted by the reflector extending from the rear side thereof into the guide pocket formed on the forward side, one of said pair of filament leads being secured to the power terminal element within the guide pocket, a ground terminal mounted by the reflector in spaced relation to the guide pocket, the other of said filament leads extending from the guide pocket and being secured to the ground terminal, potting material confined to the guide pocket in contact with the seated base portion of the bulb to hold the bulb in position relative to the reflector, a power cable secured to the power terminal element on the rear side of the reflector and means on the rear side of the reflector for receiving said power cable comprising, a channel formation on the rear side of the reflector through which the power cable extends, said power terminal element extending from the pocket through a slot into the channel formation, and locking extension means formed on the terminal element for engagement with the power cable within the channel formation to prevent withdrawal therefrom, said channel formation including at least two entrance branches, and an insert enclosing the terminal element within the channel formation leaving said entrance branches open.

11. In an instant contact lamp construction, a flat reflector member having a forward side and a rear side, a bulb having filament leads extending therefrom, means for supporting the bulb in close spaced relation to the reflector member on the forward side thereof, a power cable having a lead portion, said rear side of the reflector member having a channel formation of a depth exceeding the diameter of said power cable and projecting from the forward side in close spaced relation to the bulb, a bulb seating wall projecting from the forward side of the reflector member and connected to the projecting channel formation to form a pocket, a terminal element mounted by the reflector member in an opening formed in the channel formation, said terminal element having a notched portion disposed in the pocket and secured to one of the filament leads and an apertured locking portion disposed in the channel formation on the rear side of the reflector member receiving the lead portion of the power cable.

12. A reflector for an instant contact lamp comprising, a flat member having a forward side and a rear side, a channel formation on the rear side of the flat member projecting from the forward side, a wall projecting from the forward side and connected to the projecting channel formation to form a pocket on the forward side, said wall being provided with a bulb seating guide, a bulb positioning projection mounted on the forward side of the flat member in space alignment with the bulb seating guide, said channel formation being provided with a terminal receiving slot opening into the pocket, and an insert extension projecting from the flat member having a configuration corresponding to the channel formation adjacent opposite sides of the terminal receiving slot.

References Cited

UNITED STATES PATENTS 3,089,951   5/1963   Baldwin _____ 240—7.1

FOREIGN PATENTS 596,650   4/1960   Canada.

NORTON ANSHER, *Primary Examiner.*

F. L. BRAUN, *Assistant Examiner.*